US007626974B2

(12) United States Patent
Peisa et al.

(10) Patent No.: US 7,626,974 B2
(45) Date of Patent: Dec. 1, 2009

(54) FRAME SYNCHRONISATION IN A RADIO ACCESS NETWORK

(75) Inventors: Janne Johannes Peisa, Espoo (FI); Mats Fredrik Sagfors, Kyrkslatt (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 259 days.

(21) Appl. No.: 10/578,893

(22) PCT Filed: Nov. 24, 2003

(86) PCT No.: PCT/EP03/50881

§ 371 (c)(1),
(2), (4) Date: May 11, 2006

(87) PCT Pub. No.: WO2005/055471

PCT Pub. Date: Jun. 16, 2005

(65) Prior Publication Data

US 2007/0053339 A1     Mar. 8, 2007

(51) Int. Cl.
*H04J 3/06*     (2006.01)
(52) U.S. Cl. .......................................... 370/350; 455/18
(58) Field of Classification Search ................. 370/350, 370/278
See application file for complete search history.

(56) References Cited

U.S. PATENT DOCUMENTS

2003/0103508 A1* 6/2003 Landaveri et al. ........ 370/395.1

(Continued)

FOREIGN PATENT DOCUMENTS

EP     0 896 442     2/1999

(Continued)

OTHER PUBLICATIONS

"Universal Mobile Telecommunications System (UMTS); Synchronisation in UTRAN; Stage 2 (3GPP TS 25.402 version 5.2.0 Release 5); ETSI TS 125 402", ETSI Standards, European Telecommunications Standards Institute, 'Online!, vol. 3-R3, No. V520, Jun. 2003, XP014008867.

(Continued)

*Primary Examiner*—Rafael Pérez-Gutiérrez
*Assistant Examiner*—Marcos Batista
(74) *Attorney, Agent, or Firm*—Nixon & Vanderhye P.C.

(57)     ABSTRACT

A method of optimizing the timing offsets with which data frames are transmitted over the Iur/Iub interfaces of a UMTS Terrestrial Radio Access Network, UTRAN. The method comprises, for a given Iur/Iub interface or set of Iur/Iub interfaces over which identical user plane data is to be sent, defining a duration of a data frame receiving window for use by the receiving node(s), transmitting data frames from a sending node with an initial timing offset sufficient to ensure a likelihood that the frames will be received at the or each receiving node within the defined receiving window, reducing the timing offset at the sending node in a stepwise manner, and adjusting the timing offset at the sending node in response to the receipt of late Time of Arrival error reports at the sending node. In a second embodiment, the frame synchronisation of frames corresponding to speech services and data services is carried out by delaying the frames corresponding to speech services a fixed delay and the frames corresponding to data services a variable delay based on a received time of arrival feedback.

16 Claims, 5 Drawing Sheets

U.S. PATENT DOCUMENTS

2003/0219005 A1 * 11/2003 Isnard et al. ............... 370/350

FOREIGN PATENT DOCUMENTS

| EP | 0 896 442 A | 2/1999 |
|---|---|---|
| EP | 1 199 853 | 4/2002 |
| EP | 1 199 853 A | 4/2002 |
| EP | 1 359 776 | 11/2003 |
| EP | 1 359 776 A | 11/2003 |
| WO | 99/50972 A | 10/1999 |
| WO | WO 99/50972 | 10/1999 |
| WO | 01/78441 A | 10/2001 |
| WO | WO 01/78441 | 10/2001 |

OTHER PUBLICATIONS

3GPP TS 25.402 v5.2.0, $3^{rd}$ Generation Partnership Project; Technical Specification Group Radio Access Network; Synchronisation in UTRAN Stage 2 (Release 5) (Jun. 2003), pp. 1-47.

* cited by examiner

FRAME SYNCHRONISATION IN A RADIO ACCESS NETWORK

This application is the U.S. national phase of international application PCT/EP2003/50881, filed 24 Nov. 2003, which designated the U.S., the entire content of which is hereby incorporated by reference.

TECHNICAL FIELD

The technology relates to frame synchronisation in a radio access network and in particular to frame synchronisation between a Radio Network Controller and a NodeB of a UMTS Radio Access Network (UTRAN).

BACKGROUND

The Third Generation Partnership Project group, known as 3GPP, is involved in ongoing standardisation work on the WCDMA group of protocols referred to as UMTS or 3G. A UMTS operator network can be separated into a number of major components, namely one or more core networks which are responsible for setting up and controlling user sessions, and a UMTS Radio Access Network (UTRAN) which controls access to the air interface. The architecture of a UTRAN is illustrated schematically in FIG. 1. The interface between the UTRAN and the user equipment (UE) is provided by nodes referred to as "NodeBs". The NodeBs are responsible for transmitting and receiving data over the air interface and are controlled by Radio Network Controllers (RNCs). User and control data is routed between UEs and a core network via the NodeBs and the RNCs. The interface between a NodeB and an RNC is referred to as the Iub interface.

There are situations in which the same data may be transmitted between a given UE and an RNC via two or more NodeBs. This is referred to as Diversity Handover Function (DHO). The NodeBs may be controlled by the same or different RNCs. In the latter case, data is routed to the controlling (or serving) RNC via a drift RNC. The interface between the serving and the drift RNC is referred to as the Iur interface. Both scenarios are illustrated in FIG. 1.

The user-plane protocols between an RNC, NodeB, and UE are illustrated schematically in FIG. 2. One job of these (UP) protocols is the implementation of a Frame Synchronization function which takes care of the timing of frames over the Iub interface between an RNC and the associated NodeB's. An important function influencing Frame Synchronization is the handling of the DHO scenario in which the same frames are transmitted over a number of legs, some of which also may be relayed via a Drift RNC over the Iur interface. In the downlink direction, as the transmission over the air has to be synchronized, the Frame Synchronization function has to make sure that copies of the same frame received over different Iub's/Iur's with differing delays are received on time for sending. FIG. 3 illustrates the frame synchronisation window at a NodeB in relation to the (DL) radio frame structure, where the time taken to process a frame at the NodeB is defined as Tproc. In the uplink direction, the serving RNC must coordinate the receipt of identical frames received over the different Iub's/Iur's, and again the Frame Synchronization function must ensure that frames are received at the serving RNC on time.

Considering further the downlink direction, a certain frame with an associated CFN number must be transmitted over the air at a given time. If there are several NodeBs and Iub/Iur links involved, all NodeBs have to transmit that particular frame at the same time. Assuming that the delays over the Iub links differ, the serving RNC must send the frame with a sufficient time-offset, so that the frames are received at all transmitting NodeBs on time. Those NodeBs "behind" a fast Iub link must buffer the frames until the scheduled time for transmission.

To supervise this function, 3GPP TS 25.402 specifies parameters defining a "Receiving Window", which facilitates monitoring of whether frames are received early or late at a NodeB. These parameters are illustrated in FIG. 3. The window serves as a 'target' so that ToAWS (rime of Arrival Window Start point) defines the earliest point and the minimum buffering capability needed by the NodeB, while the ToAWE (Time of Arrival Window End point) defines the latest 'desired' arrival time of a frame. Frames received during the period between ToAWE and a LtoA (Latest Time of Arrival) point are considered late, but not too late for transmission. Frames received after LtoA are discarded. The standard specifies how the NodeB shall report to the RNC in case the frames are received outside the widow, so that the RNC can adapt its offset accordingly: for each frame received outside the Receiving Window, the NodeB shall respond with a "Timing Adjustment" frame, indicating the ToA (Time of Arrival) of the frame, so that the serving RNC can adjust its offsets.

In order to make sure that all NodeBs receive frames on time, the Frame Synchronization must be in a "worst-case" mode, where the Iub/Iur "leg" with the worst delay is ruling the offset. A similar approach may be applied to ensure frame synchronisation in the uplink direction.

The standard 25.402 supports certain tools Or Timing adjustment and ToA monitoring on the Iub/Iur interfaces. One such tool simply involves trusting the "Receiving Window" function as described above. However, in order to receive frequent and trustworthy measurements of the frame-arrival process, it would be necessary to define a very narrow window such that frequent feedback from the receiving node (RNC or NodeB) is achieved. This is far from ideal, as to do so would generate a lot of reverse link traffic. With very small windows, the messages from different receiving nodes could also be ambiguous, with one receiving node reporting a need to reduce the offset, while another is reporting a need to increase it. In practice, a rather large window (based on pre-configured parameters settable by the operator) tends to be defined. Timing adjustments are assumed to be very rare. Thus, the window-mechanism is not used in practice for offset tuning—rather it is used as a tool for recovering from fault events. Of course the result of adopting this approach is that there is no means for actively monitoring and adapting the offset timing in real or near real-time, and the offset delay used for frame synchronisation is likely to unnecessarily delay the end-to-end transfer of data, especially during periods of relatively light loading of the data link (or a favourable transport topology).

A second tool for determining timing adjustments involves using DL Synchronization Control frames. The specification 25.402 defines that the NodeB must always respond to the receipt of such a frame with a UL Synchronization Control frame including the value of the ToA of the DL Synchronization Control frame. However, the DL Synchronization Control frames can only be sent when no DL data frames are sent. This means that the ToA monitored with this procedure does not provide a reliable measure of the "true" ToA characteristics of data frames. In addition, in order to obtain high quality statistics of the ToA process, it would be necessary to perform frequent ToA measurements. A procedure using DL Synchronization Control frames would result in excessive extra traffic in both the up- and downlink directions. For an "active" connection with a lot of traffic, it is not possible to use this function. It is noted that there is no standardised solution for the uplink direction, equivalent to this approach. Uplink solutions are vendor specific.

SUMMARY

The current solution for achieving frame synchronisation has a major drawback, namely the potential unnecessary buffering and delays in both uplink and downlink. A hypothesis put forward here is that different RAB types (and traffic sources) place different demands on the delay and on the Frame Synchronization procedure. Whilst current Frame Synchronization designs may be very well suited for speech, these designs do not necessarily provide the best possible service for Acknowledged Mode (AM) bearers, transporting for example data.

Speech services belong to the "Conversational" class in terms of QoS classification. This QoS class has the most stringent delay requirements regarding delay and delay jittering. Speech services should be prioritised over Iub interface, resulting in tight delay requirements for Speech. Relative to other services, the delay offsets are therefore most stringent for Speech services. Speech services are typically realised using TM bearers, although this need not be the case (e.g. Voice over IP).

Speech is particularly sensitive to delay jittering, due to limited buffering in the end-to-end path between the speech encoder and decoder. Once the speech encoder-decoder pair is synchronized to a given (one way) delay, large jittering may cause frames to be lost resulting in a reduction of the subjective speech quality. It is therefore most important to maintain the delay and pacing of the transfer, as in the current Frame Synchronization solutions. The absolute delay is of less importance given the insensitivity of human perception to short delays (e.g. less than 150 ms) in verbal communication. However, the acceptable delay variation (jitter) during a call is limited to 1 ms.

Packet Switched (PS) bearers belonging to the Interactive or Streaming class have relatively loose requirements on delay. PS bearers can therefore be realized using the AM mode, in order to increase radio resource efficiency. Due to the non-stringent formal requirements on delay, the offset related to Frame Synchronization can be set to rather loose values.

Due to the loose delay requirements in terms of QoS, a common misconception is to assume that packet-data performance is non-sensitive to delay. Indeed, packet-data services work also over high-latency connections, but the performance is critically dependent on the latency. This is particularly true for highly interactive traffic such Telnet, which is characterized by its request-response nature. In the case of gaming applications, it well known that players behind low-latency connections have a competitive edge over players experiencing long delays. In addition, we note that also web-traffic and FTP transfers suffer if the end-to-end delay is high. In these cases, it is not only the slow response to human action that matters (as in gaming and Telnet), but also the requirements set by the TCP protocol. TCP performance is highly dependent on the end-to-end delay through its congestion control mechanisms and TCP session setup and release procedures.

Thus, compared to Speech services, packet data services are much less sensitive to jitter, but potentially more sensitive to delay. There is therefore a strong incentive to provide the lowest link latency for packet-data bearers that can be supported at any moment of time, even if some delay jittering would be the cost.

According to a first aspect of the present invention there is provided a method of transporting data over the Iub/Iur interface of a UMTS Terrestrial Radio Access Network, UTRAN, in which frame synchronisation at the receiving node is achieved by delaying the sending of data frames from the sending node by an offset delay, the method comprising:
   for speech services, defining said offset delay as a substantially fixed delay; and
   for data services, defining an initial offset delay and dynamically varying the delay at the sending node based upon Time of Arrival feedback received from the receiving node, to optimise the offset delay value.

According to a second aspect of the present invention there is provided a node for use in a UMTS Terrestrial Radio Access Network, UTRAN, the node comprising:
   means for transmitting data frames to one or more receiving nodes via Iub/Iur interfaces with an initial timing offset; and
   means for applying dynamically varying the offset for data services based upon Time of Arrival feedback received from the receiving node(s), whilst maintaining the timing offset substantially constant for speech services.

It is an object of the present invention to overcome or at least mitigate the disadvantages of known frame synchronisation techniques over the Iur/Iub interfaces. This and other objects are achieved by providing processes which enable a more continuous monitoring of the ToAs of frames at the receiver.

According to a second aspect of the present invention there is provided a method of optimising the timing offsets with which data frames are transmitted over the Iur/Iub interfaces of a UMTS Terrestrial Radio Access Network, UTRAN, the method comprising:
   for a given Iur/Iub interface or set of Iur/Iub interfaces over which identical user plane data is to be sent, defining a duration of a data frame receiving window for use by the receiving node(s);
   transmitting data frames from a sending node with an initial timing offset;
   reducing the timing offset at the sending node in a stepwise manner; and
   adjusting the timing offset at the sending node in response to the receipt of late Time of Arrival error reports at the sending node.

In certain embodiments of the present invention, the initial timing offset may be set to a value sufficient to ensure a likelihood that the frames will be received at the or each receiving node within the defined receiving window. In other embodiments, the initial timing offset may be set to a value short enough to ensure a likelihood that early frames are received outside of that defined window, thus triggering the sending of a late Time of Arrival error report.

According to a third aspect of the present invention there is provided a method of optimising the timing offsets with which data frames are transmitted over the Iur/Iub interfaces of a UMTS Terrestrial Radio Access Network, UTRAN, the method comprising:
   for a given Iur/Iub interface or set of Iur/Iub interfaces over which identical user plane data is to be sent, defining a duration of a data frame receiving window for use by the receiving node(s);
   transmitting data frames from a sending node with an initial timing offset;
   at the or each receiving node, collecting and/or computing Time of Arrival statistics for received data frames;
   periodically reporting said statistics to the sending node; and adjusting the timing offset at the sending node on the basis of the received statistics.

The statistics collected at a receiving node may be any suitable statistics relating to Times of Arrival. Preferably, these include one or more of; the mean, minimum, maximum, and variance of Times Of Arrival for data frames received during some time period, that time period typically being the time period since the last statistics report was sent to the sending node.

The method may comprise sending from the sending node to the or each receiving node instructions identifying the statistics to be collected at the receiving node and sent to the sending node. The instructions may identify the regularity with which the statistics must be sent, or events defining when the statistics should be sent (e.g. upon a change in one or more parameters).

The method may comprise sending polling requests from the sending node to the or each receiving node instructing the return of statistics.

The sending node may be one of a Radio Network Controller, RNC, or a NodeB. The or each receiving node will be the other of an RNC or NodeB. The different aspects of the present invention may be applied in one or both of the uplink and downlink directions.

The different aspects of the present invention are particularly applicable in a Macro Diversity scenario, where identical user plane data is being transmitted between User Equipment, UE, and an RNC via two or more NodeBs.

Adjustment of the timing offset is performed by intelligence implemented at the sending node. The offset may be varied using some predefined algorithm and the information received from the or each receiving node.

According to a fourth aspect of the present invention there is provided a node for use in a UMTS Terrestrial Radio Access Network, UTRAN, the node comprising:

means for transmitting data frames to one or more receiving nodes via Iub/Iur interfaces with an initial timing offset;
means for reducing the timing offset in a stepwise manner; and
means for adjusting the timing offset in response to the receipt of late Time of Arrival error reports.

According to a fifth aspect of the present invention there is provided a node for use in a UMTS Terrestrial Radio Access Network, UTRAN, the node comprising:

means for transmitting data frames to one or more receiving nodes via Iub/Iur interfaces with an initial timing offset; and
means for receiving statistical data sent periodically from the or each receiving node and relating to the Times of Arrival of data frames at respective receiving nodes, and for adjusting the timing offset on the basis of the received statistics.

The node of the third or fourth aspect of the present invention may be a Radio Network Controller or a NodeB.

The terminology used here to define the communications network and the radio access network is specific to 3G, i.e. UMTS, UTRAN, and Iub/Iur. However, the skilled person will appreciate that the present invention is also applicable to enhancements and successors of 3G, including 4G, whatever the terminology used in the relevant standards and protocols to describe equivalent components and interfaces.

DETAILED DESCRIPTION

The comparably low sensitivity to jittering for packet switched services has made it possible to realize packet switched domain bearers using the Acknowledged Mode RLC. By itself, AM-mode typically also introduces delay jittering, since SDUs suffering from transmission losses are delayed until re-transmissions repair them. In-sequence delivery further increases the traffic burstiness over the RAB egress Service Access Point (SAP). Burstiness is in fact an inherent feature of IP traffic, due to the non-existent QoS guarantees in today's IP backbone networks. In case there are some end-to-end requirements on the delay of the packets, as for Streaming applications, these requirements are typically handled by buffering before play-out.

In addition, it is noted that no strict pacing of the Frames towards the AM RLC is required. This is true, since the AM RLC cannot maintain any paced delivery over its egress SAPs. At times of low Frame Protocol latency, the RLC round trip time (RTT) could be shortened, and the end-to-end perception of the service would be improved.

Figure 1:
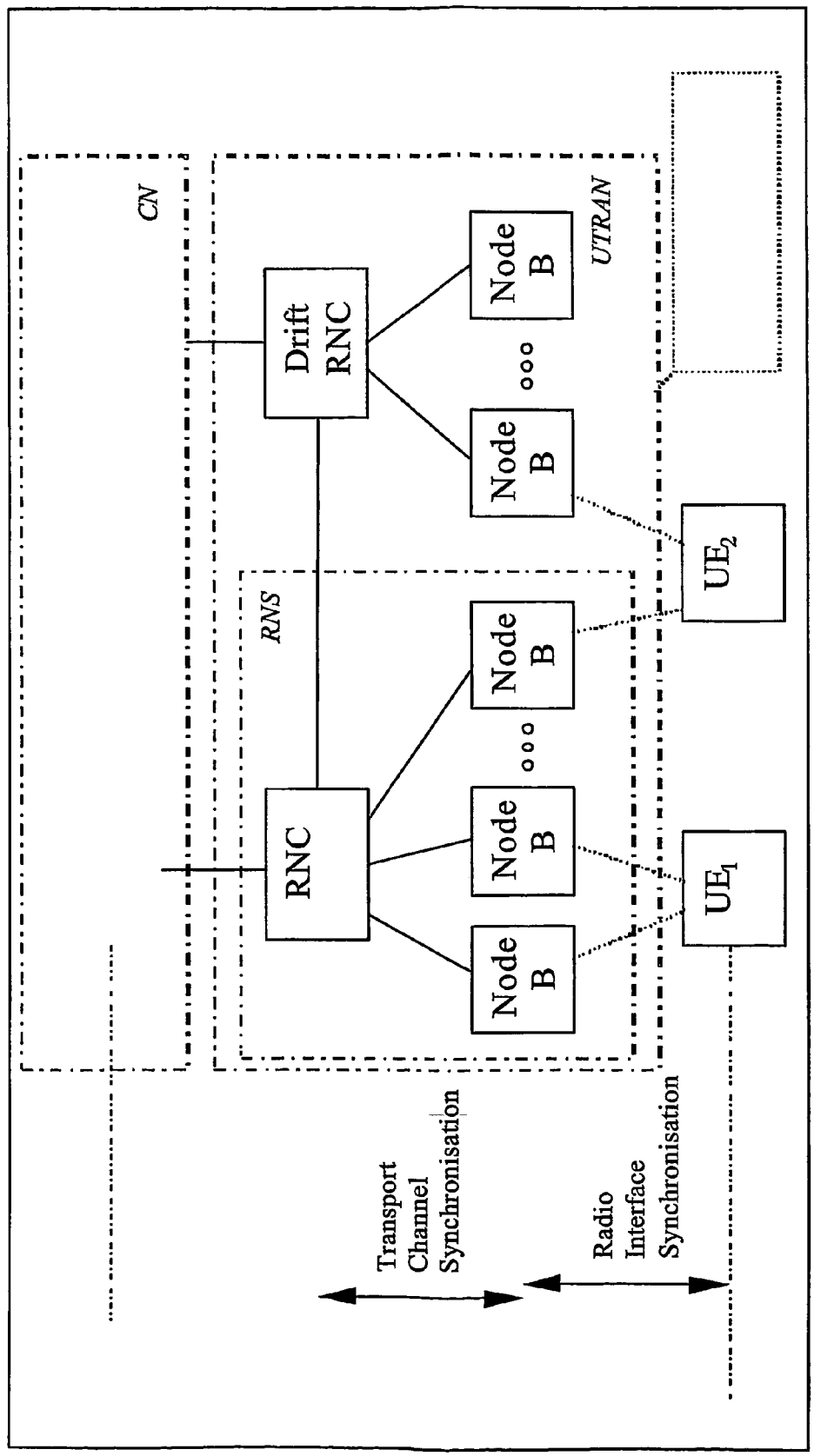
FIG. 1 illustrates schematically a UTRAN of a UMTS network.
Figure 2:
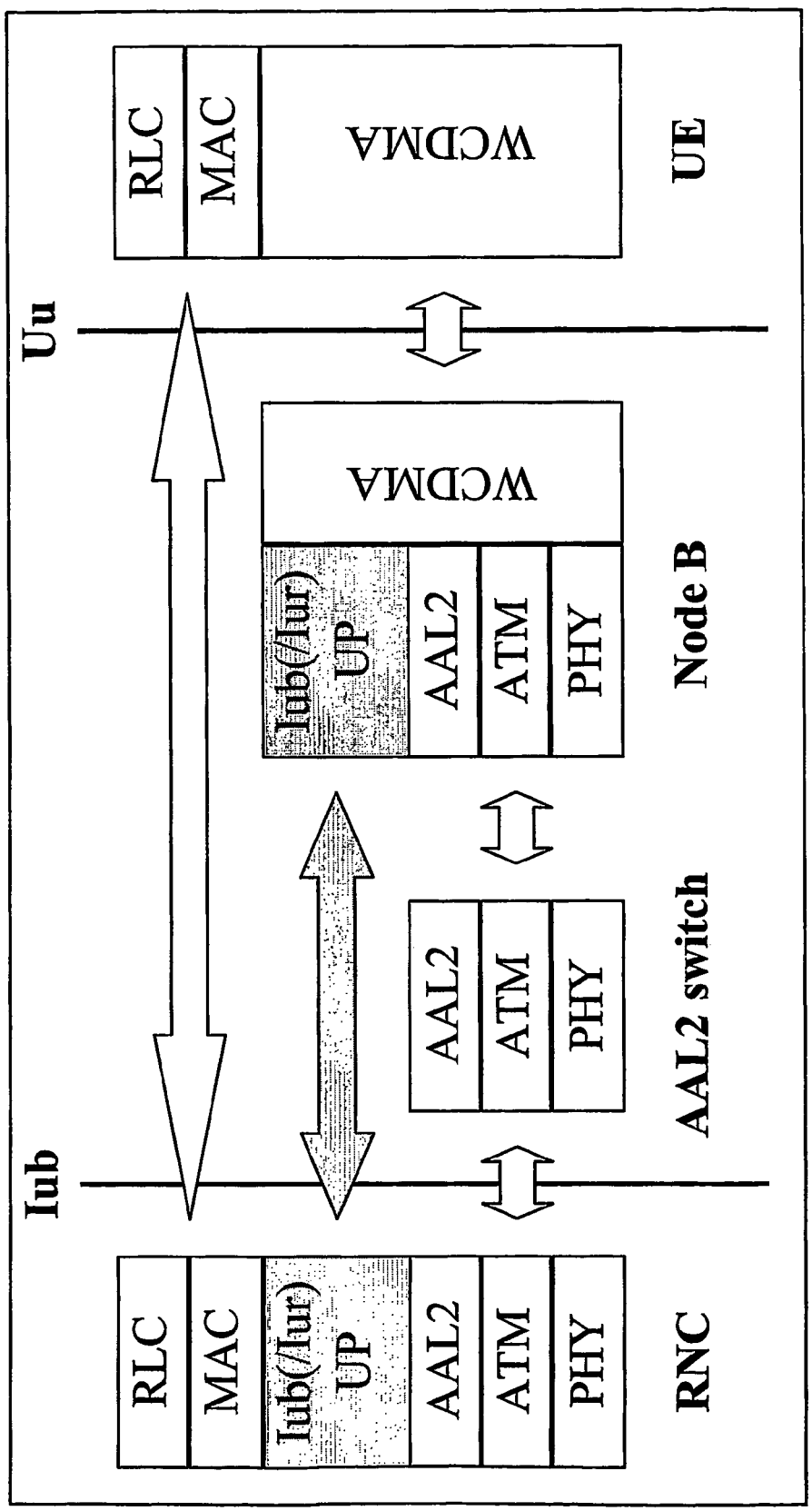
FIG. 2 illustrates schematically the user plane protocols providing for communication between an RNC, NodeB, and UE of the UTRAN of FIG. 1.
Figure 3:
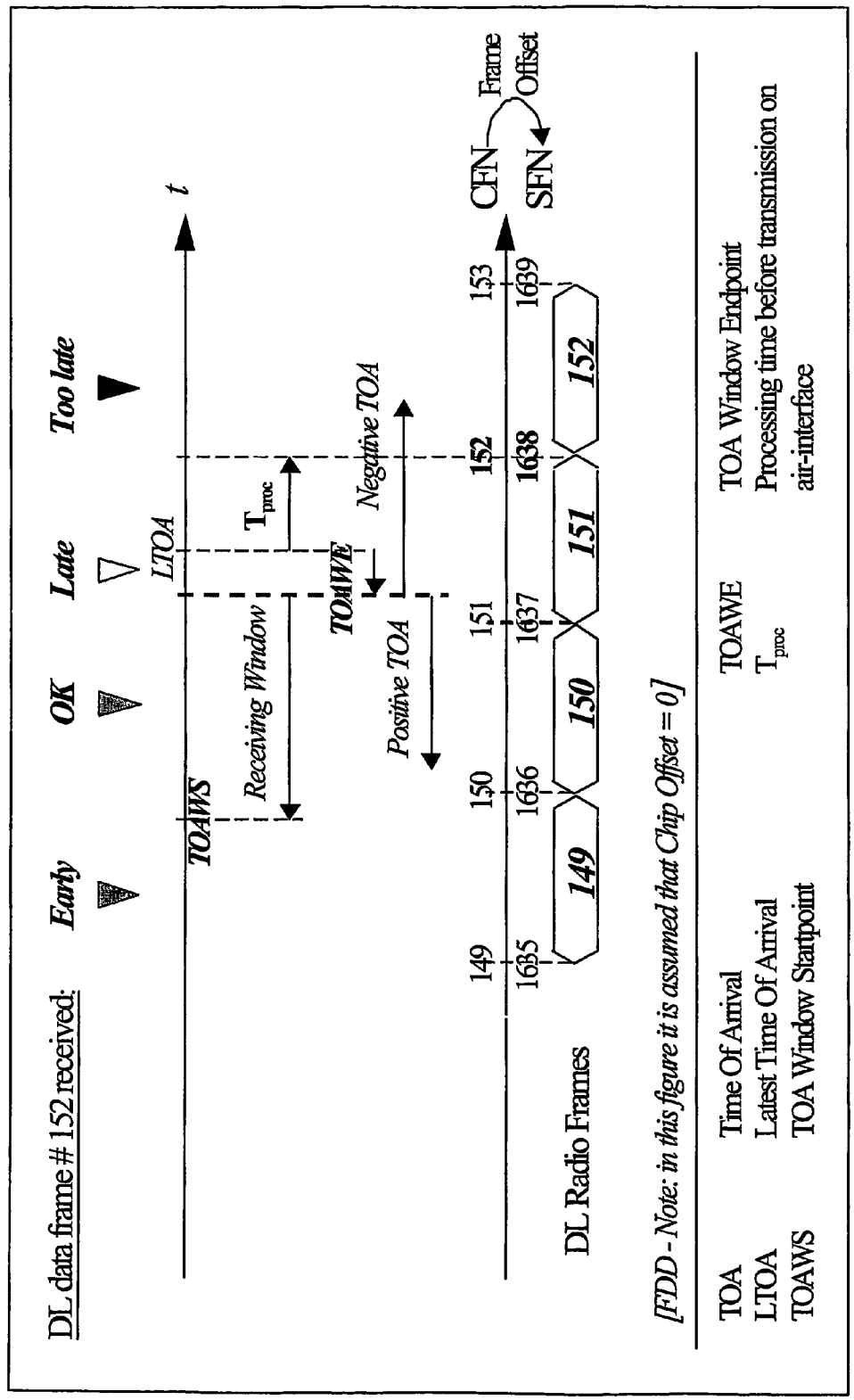
FIG. 3 illustrates frame synchronisation requirements at an RNC or NodeB of the UTRAN of FIG. 1.

The requirement for setting the offset delay for frame transmissions over the Iub/Iur interface in the UTRAN has been discussed above with reference to FIGS. 1 to 3. It will be appreciated that for minimal end-to-end data transmission delay with rare frame losses, as is desirable for packet data services, it is desirable to have the frames received as close to the Latest Time of Arrival (LtoA) as possible (see FIG. 3) with rare receptions in the "Too Late" region. As noted above, the existing procedures for setting the offset delay do not provide efficient means to achieve this in an optimal way. Either ToA data is received by the frame sender only rarely, so that only a very prudent solution with excessive offsets is feasible, or it is necessary to send significant extra measurement traffic over the Iub/Iur.

A first preferred solution provides for an adaptive transmission offset control method, by which the delay over the Iub/Iur is continuously adapted to the prevailing conditions in the transport network. Using this method, the lowest possible delay—at any point in time and for any transport network topology—can in principle be achieved. The ToAWE limit is continuously challenged by successively (but slowly) decreasing the transmission offset at the sending node, with Timing Adjustment Frames being issued by the receiving node when frames are received after the ToAWE point. When a Timing Adjustment Frame is received by the sending node, the timing offset is increased with an amount which is large relative to a single reduction step.

Figure 4:
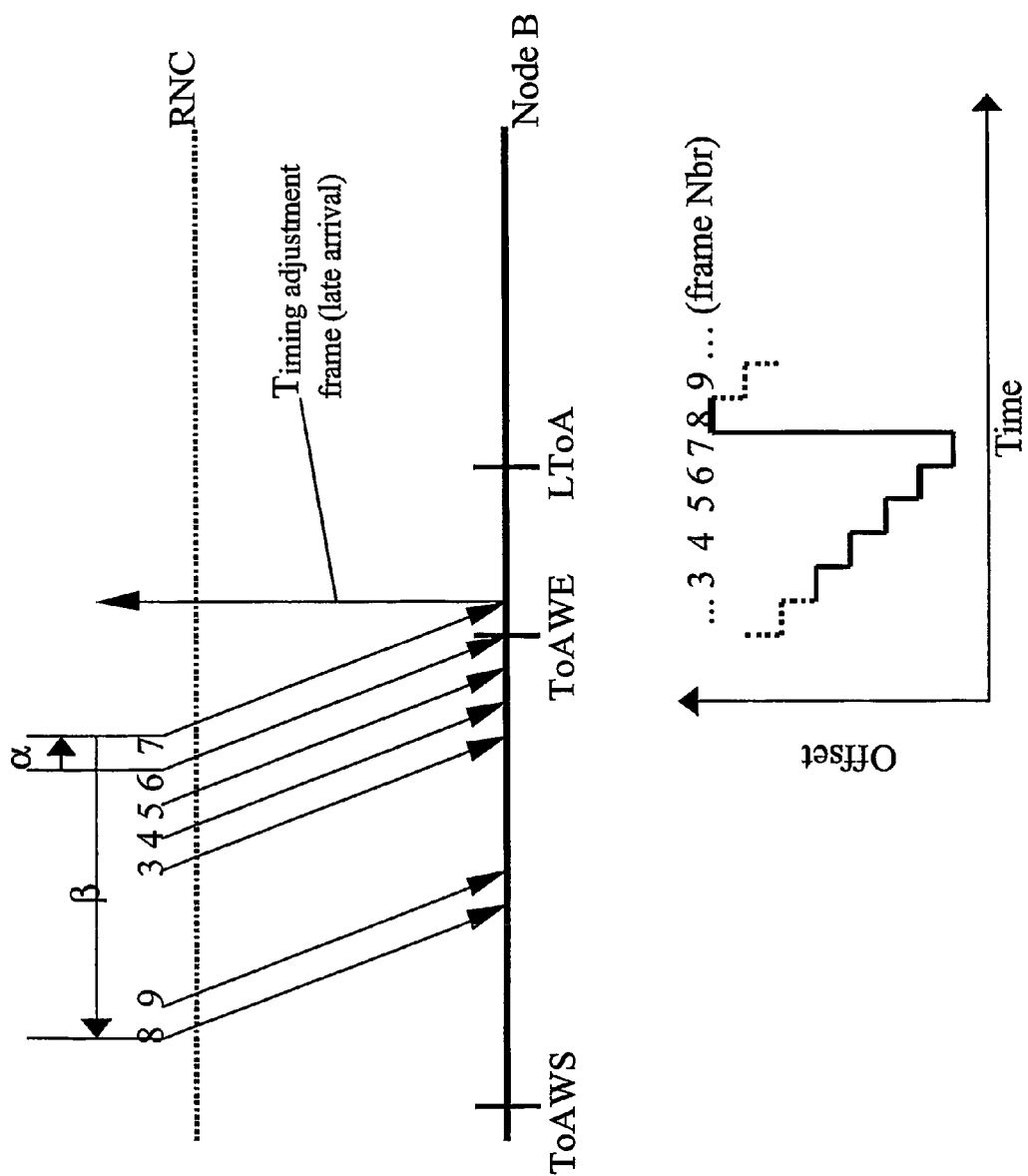
FIG. 4 illustrates schematically a timing offset optimisation procedure according to a first embodiment of the present invention.

The procedure is illustrated in FIG. 4. The lowest limit of the offset is continually probed at the sending node by decreasing the offset by an amount or step $\alpha$ for each successively transmitted frame. When the limit is hit, i.e. a first frame is received after ToAWE and a Timing Adjustment Frame received by the sending node, the offset is increased by a step $\beta$ (where $\beta = k\alpha$ and k is a constant greater than 1). Note that the average number of Timing Adjustment Frames relative to the number of data frames can be determined from the fraction $\alpha/\beta$. Note also that the variance of the transport network delay should preferably be reflected in the steps of $\alpha$ and $\beta$: if the delay variations are very low, the method can be operated with very small steps, i.e. arriving at a stable operating point very close to the "optimal" offset.

The steps $\alpha$ and $\beta$ may be of fixed size, or one or both may be of variable size. In the latter case, the step size may be varied adaptively, depending upon feedback timing information received at the sending node from the receiving node.

The mechanism proposed here is applicable using the Release99 version of 3G standards 25.402, 25.427 and 25.435. Of course the mechanism is also likely to be applicable to later versions and to other standards.

Figure 5:
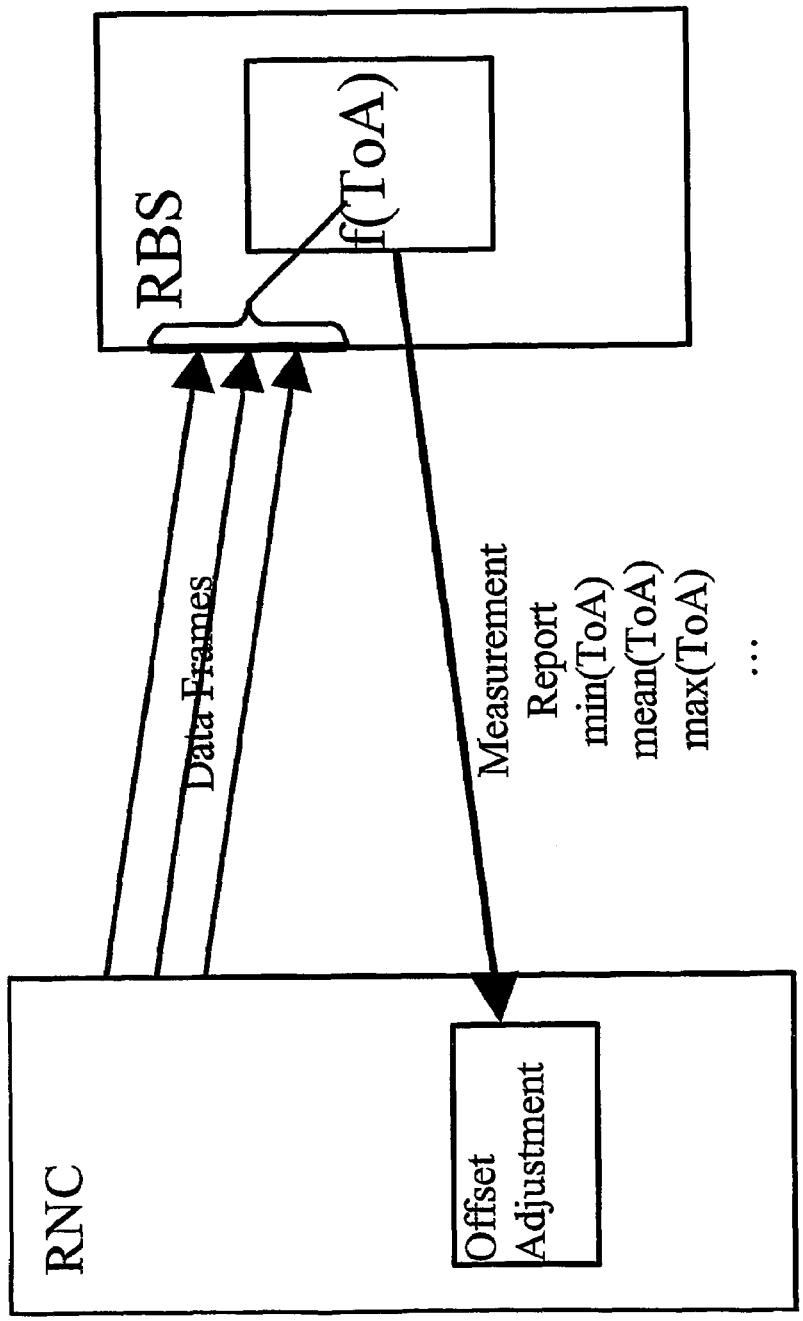
FIG. 5 illustrates schematically a procedure for optimising timing offsets according to a second embodiment of the present invention.

An alternative solution to the problem of optimising frame synchronisation is to define and implement a measurement function at a receiving node (e.g. NodeB) which, for each Transport Bearer, monitors the ToA process, and reports statistics of the arrival process to the sending node (e.g. RNC). These statistics will typically be collected over some predefined time period. Based on the received statistical information, intelligence at the RNC will judge if there are reasons to increase or decrease the timing offset. This is illustrated schematically in FIG. 5.

The statistical information of the ToA process might be any standard statistical information. However, useful and easy to produce examples are the mean, minimum and maximum values of the ToA, and possibly the variance, over the predefined period. Using the received statistics, it is easy for the sending node to decide if the timing offset can be reduced, or if it must be increased.

Based on the received ToA statistics, the receiving node may decide to trade Frame Handling reliability for transmission delay: If a certain proportion of frame losses is acceptable, the sending node may decide to set the offset so that a certain percentile of transmitted frames "hit" the receiving node in the "Too Late" region. This contrasts with the conventional approach which is to set the offset so that frames never, or only very rarely (e.g. in the event of a fault) arrive in this region.

The statistical reporting function implemented at the receiving node shall be configurable by the sending node. It shall be possible to enable or disable measurements. It shall also be possible to define the period over which the measurement reports are collected, and when they are sent. For example, the function may be configured such that a ToA Measurement Report shall be transmitted in the uplink after each block of 100 DL frames. Optionally, it shall be possible to define the period relative to the CFN, which is increasing irrespective of whether or not data is transmitted.

The invention claimed is:

1. A method of optimizing the timing offsets with which data frames are transmitted over the Iur/Iub interfaces of a UMTS Terrestrial Radio Access Network, UTRAN, the method comprising:

for a given Iur/Iub interface or set of Iur/Iub interfaces over which identical user plane data is to be sent, defining a duration of a data frame receiving window for use by the receiving node(s);

transmitting data frames from a sending node with an initial timing offset;

reducing the timing offset at the sending node in a stepwise manner using a relatively small step value $\alpha$; and adjusting the timing offset at the sending node by increasing the timing offset using a relatively large adjustment value $\beta$ in response to the receipt of one or more late time of arrival error reports at the sending node, wherein the relatively small step value $\alpha$ is smaller than the relatively large adjustment value $\beta$, and wherein $\beta=k\alpha$ and k is a constant greater than 1.

2. A method according to claim 1, wherein the relatively large adjustment value exceeds a combination of multiple ones of the relatively small step values.

3. A method of optimizing the timing offsets with which data frames are transmitted over the Iur/Iub interfaces of a UMTS Terrestrial Radio Access Network, UTRAN, the method comprising:

for a given Iur/Iub interface or set of Iur/Iub interfaces over which identical user plane data is to be sent, defining a duration of a data frame receiving window for use by one or more receiving node(s);

transmitting data frames from a sending node with an initial timing offset;

reducing the initial timing offset using a first relatively small timing offset value $\alpha$ until a report is received that a transmitted data frame is outside of the data frame receiving window;

in response to the report, increasing the reduced timing offset using a second relatively large timing offset adjustment value $\beta$;

at the one or more receiving nodes, collecting and/or computing time of arrival statistics for received data frames;

reporting said statistics to the sending node; and adjusting the timing offset at the sending node on the basis of the received statistics, wherein $\beta=k\alpha$ and k is a constant greater than 1.

4. A method according to claim 3, wherein the collected statistics include one or more of: the mean, minimum, maximum, and variance of times of arrival for data frames received during some time period.

5. A method according to claim 4, further comprising:

sending from the sending node to the one or more receiving nodes instructions identifying the statistics to be collected at the one or more receiving nodes and sent to the sending node.

6. A method according to claim 5, wherein said instructions identify a regularity with which the statistics must be sent or events defining when the statistics should be sent.

7. A method according to claim 3, further comprising:

sending polling requests from the sending node to the or each receiving node instructing the return of statistics.

8. A method according to claim 3, wherein the sending node is one of a Radio Network Controller, RNC, or a NodeB, and the one or more receiving nodes is the other of an RNC or NodeB.

9. A method according to claim 3, wherein said initial timing offset is sufficient to ensure a likelihood that the frames will be received at the one or more receiving nodes within the defined receiving window.

10. A method according to claim 3, wherein the relatively large timing offset adjustment value exceeds a combination of multiple ones of the relatively small timing offset values.

11. A node for use in a UMTS Terrestrial Radio Access Network, UTRAN, where for a given Iur/Iub interface or set of Iur/Iub interfaces over which identical user plane data is to be sent, there is a data frame receiving window having a defined duration, the node comprising:

a transmitter for transmitting data frames to one or more receiving nodes via Iub/Iur interfaces with an initial timing offset;

electronic control circuitry arranged to:

reduce by an amount α the timing offset in a stepwise manner, and adjust the timing offset by increasing an amount β, reduced timing offset in response to the receipt of one or more late time of arrival error reports, wherein the relatively small step value α is smaller than the relatively large adjustment value β, and wherein β=kα and k is a constant greater than 1.

12. A node according to claim 11 wherein the increase exceeds a combination of multiple steps.

13. A node for use in a UMTS Terrestrial Radio Access Network, UTRAN, the node comprising:

means for transmitting data frames to one ore more receiving nodes via lub/lur interfaces with an initial timing offset;

means for reducing the initial timing offset using a first relatively small timing offset value α until a report is received that a transmitted data frame is outside of a data frame receiving window;

means, in response to the report, for increasing the reduced timing offset using a second relatively large timing offset adjustment value β; wherein β=kα and k is a constant greater than 1, and means for receiving statistical data sent periodically from the or each receiving node and relating to the times of arrival of data frames at respective receiving nodes and for adjusting the timing offset on the basis of the received statistics.

14. A node according to claim 13, wherein the relatively large timing offset adjustment value exceeds a combination of multiple ones of the relatively small timing offset values.

15. A node according to claims 11 or 13, wherein the node is a Radio Network Controller.

16. A node according to claim 11 or 13, wherein the node is a NodeB.

* * * * *